United States Patent
Wang et al.

(10) Patent No.: US 8,140,702 B2
(45) Date of Patent: Mar. 20, 2012

(54) SYSTEM AND METHOD OF MAXIMIZING UTILITY IN MEDIA DELIVERY NETWORK

(75) Inventors: Yong Wang, San Jose, CA (US); Rohit S. Bodas, Avon, CT (US); Faisal Ishtiaq, Chicago, IL (US)

(73) Assignee: General Instrument Corporation, Horsham, PA (US)

( * ) Notice: Subject to any disclaimer, the term of this patent is extended or adjusted under 35 U.S.C. 154(b) by 135 days.

(21) Appl. No.: 12/647,873

(22) Filed: Dec. 28, 2009

(65) Prior Publication Data

US 2011/0161512 A1 Jun. 30, 2011

(51) Int. Cl.
*G06F 15/16* (2006.01)

(52) U.S. Cl. ........ 709/231; 709/232; 709/233; 709/234; 709/246; 709/248; 709/250; 370/350; 370/395.62; 370/507; 370/509; 370/229; 370/231; 370/232; 370/233; 370/234; 370/235; 370/241; 370/401; 370/503; 370/304; 370/324; 370/389; 370/510; 370/511; 370/512; 370/513; 370/514; 370/395.5; 725/32; 725/117; 725/114; 725/115; 725/145; 725/80; 725/81; 725/74; 725/144; 725/119; 725/1.15; 725/426.12

(58) Field of Classification Search .......... 709/231–234, 709/246, 248, 250; 725/32, 117, 114, 115, 725/145, 80, 81, 74, 144, 119; 358/1.15, 358/426.12; 370/350, 395.62, 507, 509, 370/229, 231, 232, 233, 234, 235, 241, 401, 370/503, 304, 324, 389, 510, 511, 512, 513, 370/514, 395.5
See application file for complete search history.

(56) References Cited

U.S. PATENT DOCUMENTS

| | | | |
|---|---|---|---|
| 6,480,902 B1 * | 11/2002 | Yuang et al. | 709/248 |
| 7,013,322 B2 * | 3/2006 | Lahr | 709/201 |
| 7,133,925 B2 * | 11/2006 | Mukherjee et al. | 709/231 |
| 7,191,245 B2 * | 3/2007 | Takayama | 709/231 |
| 7,321,565 B2 * | 1/2008 | Todd et al. | 370/253 |
| 7,624,417 B2 * | 11/2009 | Dua | 725/114 |
| 7,818,444 B2 * | 10/2010 | Brueck et al. | 709/231 |
| 7,822,874 B2 * | 10/2010 | Nichols et al. | 709/246 |
| 7,869,420 B2 * | 1/2011 | Tighe et al. | 370/350 |
| 7,886,073 B2 * | 2/2011 | Gahm et al. | 709/231 |
| 2002/0124111 A1 * | 9/2002 | Desai et al. | 709/246 |
| 2004/0010614 A1 * | 1/2004 | Mukherjee et al. | 709/231 |
| 2004/0267940 A1 * | 12/2004 | Dideriksen et al. | 709/228 |
| 2005/0047333 A1 * | 3/2005 | Todd et al. | 370/229 |
| 2006/0077941 A1 * | 4/2006 | Alagappan et al. | 370/338 |

(Continued)

*Primary Examiner* — John Follansbee
*Assistant Examiner* — Saket K Daftuar

(57) ABSTRACT

A method is provided for maximizing utility of a media delivery network having a media source, a first media adaptor, a second media adaptor and a media renderer. The media source can provide data in a first format and a second format. The first media adaptor can receive the data in the first format from the media source. The second media adaptor can receive the data in the second format from the media source. The first media adaptor can further provide data in a third format based on the received data in the first format. The second media adaptor can further provide data in a fourth format based on the received data in the second format. The media renderer can render the data in the third format and can render the data in the fourth format. The method includes: defining constraints of the media delivery network; predetermining factors to measure a utility of the media delivery network; defining a utility function based on the predetermined factors; and maximizing the utility function in light of the defined constraints.

16 Claims, 8 Drawing Sheets

U.S. PATENT DOCUMENTS

| | | | |
|---|---|---|---|
| 2006/0209745 A1* | 9/2006 | MacMullan et al. | 370/328 |
| 2007/0061488 A1* | 3/2007 | Alagappan et al. | 709/246 |
| 2007/0070404 A1* | 3/2007 | Caradec et al. | 358/1.15 |
| 2007/0071037 A1* | 3/2007 | Abraham et al. | 370/503 |
| 2007/0110107 A1* | 5/2007 | Tighe et al. | 370/503 |
| 2007/0177606 A1* | 8/2007 | Jabri et al. | 370/395.5 |
| 2007/0177616 A1* | 8/2007 | Jabri et al. | 370/401 |
| 2007/0180135 A1* | 8/2007 | Kenrick et al. | 709/231 |
| 2007/0180485 A1* | 8/2007 | Dua | 725/114 |
| 2007/0233893 A1* | 10/2007 | Karpoff | 709/231 |
| 2007/0294372 A1* | 12/2007 | Hlasny et al. | 709/219 |
| 2008/0040759 A1* | 2/2008 | She et al. | 725/81 |
| 2008/0046919 A1* | 2/2008 | Carmi et al. | 725/32 |
| 2008/0195761 A1* | 8/2008 | Jabri et al. | 709/250 |
| 2008/0250462 A1* | 10/2008 | Crohas | 725/74 |
| 2009/0070485 A1* | 3/2009 | Barger et al. | 709/236 |
| 2010/0011103 A1* | 1/2010 | Luzzatti et al. | 709/226 |
| 2010/0095337 A1* | 4/2010 | Dua | 725/110 |
| 2010/0122303 A1* | 5/2010 | Maloney | 725/87 |
| 2010/0132003 A1* | 5/2010 | Bennett et al. | 725/127 |
| 2010/0262920 A1* | 10/2010 | Tischer et al. | 715/745 |
| 2011/0145431 A1* | 6/2011 | Momchilov et al. | 709/231 |

* cited by examiner

SYSTEM AND METHOD OF MAXIMIZING UTILITY IN MEDIA DELIVERY NETWORK

BACKGROUND

Media content, including video, audio, images and text are increasingly consumed by way of the Internet. To protect the rights of the content holders, online media content is often provided to users on demand. Accordingly, media content may be centralized and require significant computing and networking power to be able to deliver a satisfactory viewing experience to end users.

To deliver media to end users efficiently, networks must be capable of providing media content in a variety of formats to be consumed on a variety of devices. An example media delivery network will be described with reference to FIG. 1.

FIG. 1 illustrates an example media delivery network 100. Devices in media delivery network 100 may be categorized into three classes, media sources 102, media adapters 104 and media renderers 106.

Media sources 102 provide media content, e.g., audio and video data, in a specific format or formats and are capable of transmitting the media content across media delivery network 100. In media delivery network 100, five distinct media sources are illustrated as media sources 102 for purpose of explanation. Of course any number of media sources may be used in a media delivery network. The separate media sources 102 represent media sources that are either: a media source providing a distinct format(s) of media content; and/or a media source providing a format(s) of media content for a distinct geographical area of media renderers 106. For example, one of media sources 102 may provide un-compressed streaming video content to all of media renderers 106.

Media adapters 104 are able to adapt an input format of media content to an output format for the media content. One example method of media format adaptation that media adapters 104 may perform is transcoding. Another example method of media format adaptation that media adapters 104 may perform is data stream switching.

Often, media renderers 106 are unable to render the media content in the format or formats as provided by media sources 102. To address these types of situations, media adapters 104 are able to adapt media content from one format to another format. In particular, media adapters 104 may transcode the media content from the format as provided by media sources 102 into a media content format that may be utilized by media renderers 106. For example, a specific type of media renderer may be a cellular phone that can render media content that has been encoded under the Moving Pictures Expert Group (MPEG) encoding standard, whereas a media source may only provide uncompressed media content data. To address this example situation, a media adapter may be able to transcode the uncompressed media content data as provided by the media source into an MPEG format, which may be utilized by the cellular phone.

As mentioned above, media adapters 104 may additionally adapt an input format of media content to an output format for the media content by data stream switching. In particular, media adapters 104 may be able to receive multiple data streams of media content and output a smaller number of streams. For example, a media adapter of media adapters 104 may be able to receive a first data stream from one media source and to receive a second data stream from another media source. In this situation, the media adapter may be arranged to output one of the two data streams. The output format may then be usable by other media adapters or by specific media renderers 106.

In media delivery network 100, nine distinct media adapters are illustrated as media adapters 104 for purpose of explanation. Of course any number of media adapters may be used in a media delivery network.

Media renderers 106 are devices capable of playing media content from media sources 102 for end users. For example, a specific type of media adapter may be operable to receive streaming video data and output corresponding MPEG encoded video data. In media delivery network 100, four distinct media renderers are illustrated as media renderers 106 for purpose of explanation. Of course any number of media renderers may be used in a media delivery network. The separate media renderers 106 represent media renderers that are either: a media renderers operable to receive a distinct format(s) of media content; and/or a number of media renderer, within a distinct geographical area, that are operable to receive a format(s) of media content. For example, media sources 102 may provide un-compressed streaming video content to all of media renderers 106.

Media delivery network 100 is a conventional three-tier adaptation organization; a first tier of media sources, a second tier of media adaptors and a final tier of media renderers. Of course the second tier of media adaptors may have many levels of adapters, wherein a top level adaptor may change a format received by a media source to a new format, which is then changed to another format by another media adaptor at a lower level, which is then changed to yet another format by yet another media adapter at a yet lower level, and so on. For purposes of explanation however, this multi-level scheme of adapters will be considered a single tier in the conventional three-tier adaptation organization of media delivery network 100. The media content is provided through one of media sources 102, which may be located in a cluster of media servers, or even in different physical locations. An adaptation operation is executed through media adapters 104, each of which is capable of reshaping the media content into certain adapted formats. The destination of the adapted media content is a network of media renderers 106 with diverse types of devices. This generic scenario applies to various types of applications such as classic media streaming through Internet, digital home as described by digital linked network alliance (DLNA) and pervasive peer-to-peer media communication as described by universal plug and play (UPNP) forum.

An example transmission of media content will now be described.

A media source 108 contains a specified media content requested by a media renderer 110. Media source 108 outputs the specified media content to media adapters 104, which modify the media content so that media renderer 110 may efficiently receive and display the specified media content from media source 108.

In a conventional system, there are many users using many media renderers 106 in media delivery network 100. As more users request media content over media delivery network 100, the demand on media sources 102 and media adapters 104 becomes larger. Eventually, demand may surpass the amount of content that media delivery network 100 is capable of providing. In such a case at least one media renderer would not be able to render media.

What is needed is a method of governing a media distribution network so that it can efficiently deliver media content while minimizing system resource usage and reduce or eliminate occurrences where demand is greater than the amount of content which can be provided.

BRIEF SUMMARY

An aspect of the present invention provides a method of governing a media distribution network that can efficiently deliver media content while minimizing system resource usage and reduce or eliminate occurrences where demand is greater than the amount of content which can be provided.

In accordance with an aspect of the present invention, A method is provided for maximizing utility of a media delivery network having a media source, a first media adaptor, a second media adaptor and a media renderer. The media source can provide data in a first format and a second format. The first media adaptor can receive the data in the first format from the media source. The second media adaptor can receive the data in the second format from the media source. The first media adaptor can further provide data in a third format based on the received data in the first format. The second media adaptor can further provide data in a fourth format based on the received data in the second format. The media renderer can render the data in the third format and can render the data in the fourth format. The method includes: defining constraints of the media delivery network; predetermining factors to measure a utility of the media delivery network; defining a utility function based on the predetermined factors; and maximizing the utility function in light of the defined constraints.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with an aspect of the present invention, a method of efficiently managing demand of networked media content is provided. Network loads may be balance by an example method of load distribution to service an example media source to a plurality of content users.

The idea of using graphs to represent media adaptation has been used for a multimedia adaptation framework based on semantic web technology, where state space planning and tree modeling are adopted respectively for media adaptation/streaming purposes. Nevertheless, how to define the involved components in a graph (such as node, data stream, and gain) is non-trivial has not yet been not well addressed in the prior art.

Figure 1:
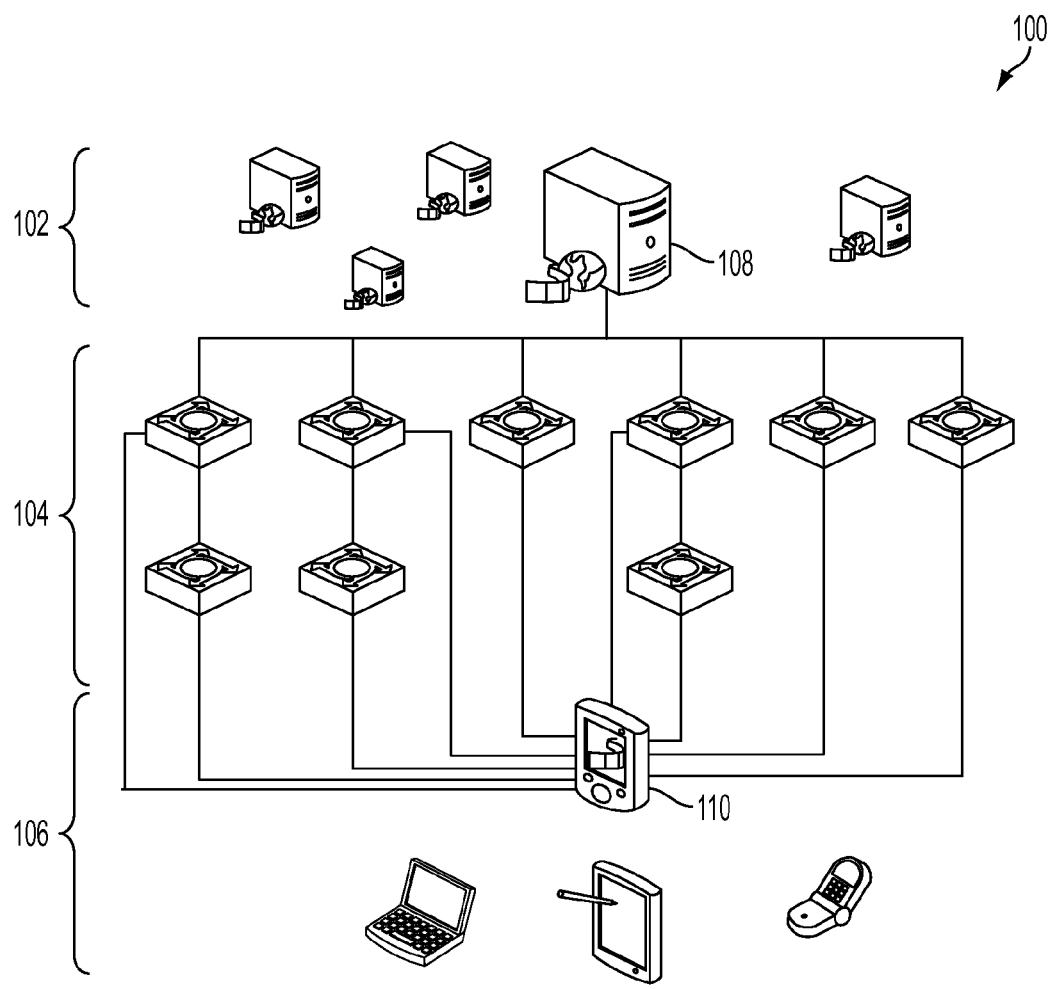
FIG. 1 illustrates a conventional media network.
Figure 2:
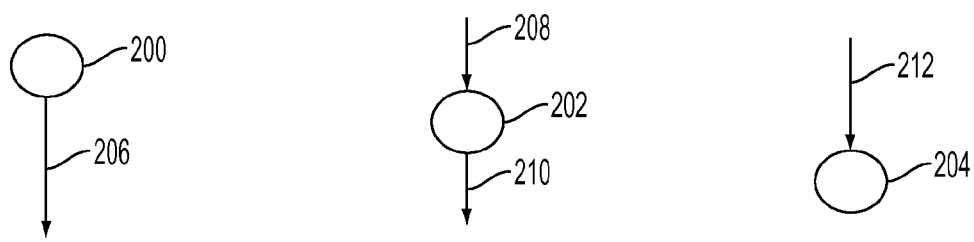
FIG. 2 illustrates example nodes for use in a media adaptation graph.

FIG. 2 illustrates example nodes for use in a media adaptation graph. A first example node type is a media source 200 having an output 206. Media source 200 may represent any type of networked media content provider, wherein non-limiting examples of the media content includes video, audio, still images and text. A second example node type is a media adapter 202 having an input 208 and an output 210. Media adapter 202 may represent any type of media processing device used to accept a first form of media content as input and output another form of media content, non-limiting examples of which include media encoders and decoders. A third example node type is a media renderer 204 having an input 212. Media renderer 204 may represent a grouping of users who wish to access media content over an example media network. A non-limiting example group of users may be the group of users who will access the media content via cell phones. Another non-limiting example group of users may be group of users who will access the media content from a given city.

Furthermore, each input or output is associated with certain media type(s). The media type is examined during the connection to determine whether two (from an output to an input) connectors can be connected so that a data stream can be created. For automatic connection, a set of pre-defined media types considering the most frequent cases may be provided. Non-limiting examples of media types include:

Media Modality: Video, audio, image, text, etc.

Video Info: Codec format, frame resolution, frame rate, etc.

Audio Info: Codec format, channels, sampling rate, etc.

Image Info: Codec format, size, color depth, etc.

It should be noted that one connector may adopt multiple media types. For example, the input connector of a media renderer may accept both video and audio streams. Further, the definition of the media format is not necessarily limited to certain values. For example, the input connector of an image resizer may accept arbitrary resolution. Therefore, when two connectors are connected, the format of the media stream is not yet determined This not only guarantees the intelligent connection during graph construction, but also provides flexibility in selecting optimal adaptation operations, wherein the data streams are modified based on predetermined constraints to maximize overall utility.

Figure 3:
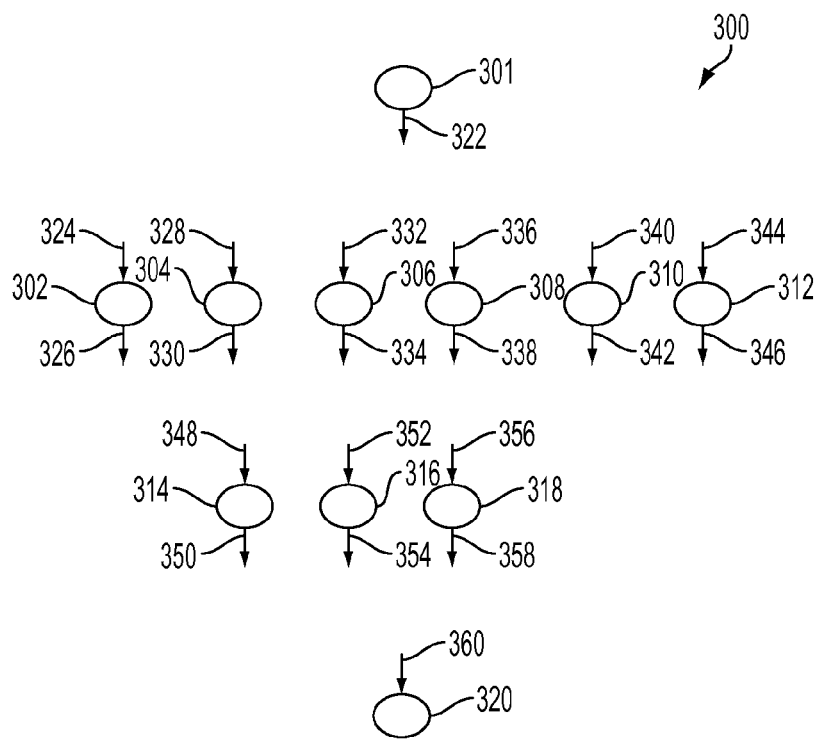
FIG. 3 illustrates an example media adaptation node network.

An example media adaptation graph will include several example nodes described in FIG. 2. FIG. 3 illustrates an example media adaptation node network.

For purposes of explanation, consider a media source that provides videos with MPEG-2/DVD format. Several adaptation engines may be available to transcode the media content.

Some adaptation engines may require manual operation to prepare the adapted media content in advance. For example, a news provider can have a piece of news pre-edited into different modalities (video, image, audio, text, etc). In this example, this operation is also considered as one type of adaptation engine. In this example, a media renderer is a mobile device with certain rendering capability. The corresponding nodes are also shown in FIG. 3.

In FIG. 3, a graph 300 includes a media source 301, media adapters 302, 304, 306, 308, 310, 312, 314, 316 and 318 and a media renderer 320. Media source 301 has an output 322. Media adapter 302 has an input 324 and an output 326. Media adapter 304 has an input 328 and an output 330. Media adapter 306 has an input 332 and an output 334. Media adapter 308 has an input 336 and an output 338. Media adapter 310 has an input 340 and an output 342. Media adapter 312 has an input 344 and an output 346. Media adapter 314 has an input 348 and an output 350. Media adapter 316 has an input 352 and an output 354. Media adapter 318 has an input 356 and an output 358. Media renderer 320 has an input 360.

Media source 301, media adapters 302, 304, 306, 308, 310, 312, 314, 316 and 318 and media renderer 320 may be connected to form a media adaptation graph. Specifically, data streams may be drawn to connect media source 301 and media renderer 320 by way of media adapters 302, 304, 306, 308, 310, 312, 314, 316 and 318 with some restrictions. Data streams are generated by attempting to connect output 322 to all accepting inputs among 324, 328, 332, 336, 340, 344, 348, 352, 356 and 360 and connections are made for all cases where input 324, 328, 332, 336, 340, 344, 348, 352, 356 and 360 are capable of accepting a media format output from media source 301 by way of output 322. Subsequent connections are made between outputs 326, 330, 334, 338, 342, 346, 350, 354 and 358 and inputs 324, 328, 332, 336, 340, 344, 348, 352, 356 and 360 where the media format of output 326, 330, 334, 338, 342, 346, 350, 354 and 358 matches the media format of input 324, 328, 332, 336, 340, 344, 348, 352, 356 and 360.

To reduce redundancies, media adapters 302, 304, 306, 308, 310, 312, 314, 316 and 318 may only be used once per data stream from media source 301 to media renderer 320. Specifically, for any set of connections starting from media source 301 and ending at media renderer 320, following outputs to inputs along the connections media adapters 302, 304, 306, 308, 310, 312, 314, 316 and 318 cannot be used more than once. This restriction also avoids deadlock loop, wherein more than one media adapter attempts to obtain data from the same place thus deadlocking each other.

Example media adaptation graphs for various example media renderers will be described with reference to FIG. 4A-4D.

Figure 4A:
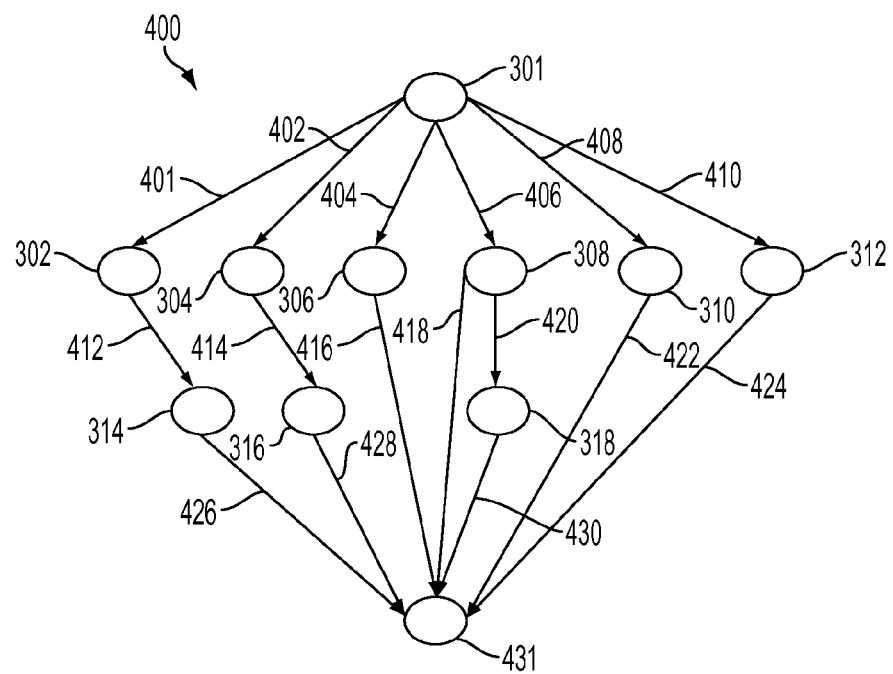
FIG. 4A illustrates a media adaptation graph for an example media renderer.

FIG. 4A illustrates an example media adaptation graph 400 distributing the content of media source 301 to a media renderer 431. Media adaptation graph 400 includes media source 301, media adapter 302, media adapter 304, media adapter 306, media adapter 308, media adapter 310, media adapter 312, media adapter 314, media adapter 316, media adapter 318 and media renderer 431. Media source 301 is connected to media adapter 302 via data stream 401. Media source 301 is connected to media adapter 304 via data stream 402.

For purposes of discussion, presume that media source 301 is operable to provide media content in six different formats. Further, presume that media renderer 431 is operable to process media content in seven formats, which are all different from the six formats provided by media source 301.

Media source 301 outputs media content in a first format to media adapter 302 via a data stream 401. Media source 301 outputs media content in a second format to media adapter 304 via a data stream 402. Media source 301 outputs media content in a third format to media adapter 306 via a data stream 404. Media source 301 outputs media content in a fourth format to media adapter 308 via a data stream 406. Media source 301 outputs media content in a fifth format to media adapter 310 via a data stream 408. Media source 301 outputs media content in a sixth format to media adapter 312 via a data stream 410.

Media adapter 302 transcodes the media content from the first format to a seventh format that is readable by media adapter 314 and then outputs the transcoded media content to media adapter 314 via a data stream 412. Media adapter 304 transcodes the media content from the second format to an eighth format that is readable by media adapter 316 and then outputs the transcoded media content to media adapter 316 via a data stream 414. Media adapter 308 transcodes the media content from the fourth format to an ninth format that is readable by media adapter 318 and then outputs the transcoded media content to media adapter 318 via a data stream 420.

Media adapter 314 transcodes the media content from the seventh format to a tenth format that is readable by media renderer 431 and then outputs the transcoded media content to media renderer 431 via a data stream 426. Media adapter 316 transcodes the media content from the eighth format to an eleventh format that is readable by media renderer 431 and then outputs the transcoded media content to media renderer 431 via a data stream 428. Media adapter 306 transcodes the media content from a third format to a twelfth format that is readable by media renderer 431 and then outputs the transcoded media content to media renderer 431 via a data stream 416. Media adapter 308 additionally transcodes the media content from the fourth format to a thirteenth format that is readable by media renderer 431 and then outputs the transcoded media content to media renderer 431 via a data stream 418. Media adapter 318 transcodes the media content from the ninth format to a fourteenth format that is readable by media renderer 431 and then outputs the transcoded media content to media renderer 431 via a data stream 430. Media adapter 310 transcodes the media content from a fifth format to a fifteenth format that is readable by media renderer 431 and then outputs the transcoded media content to media renderer 431 via a data stream 422. Media adapter 312 transcodes the media content from a sixth format to a sixteenth format that is readable by media renderer 431 and then outputs the transcoded media content to media renderer 431 via a data stream 424.

Figure 4B:
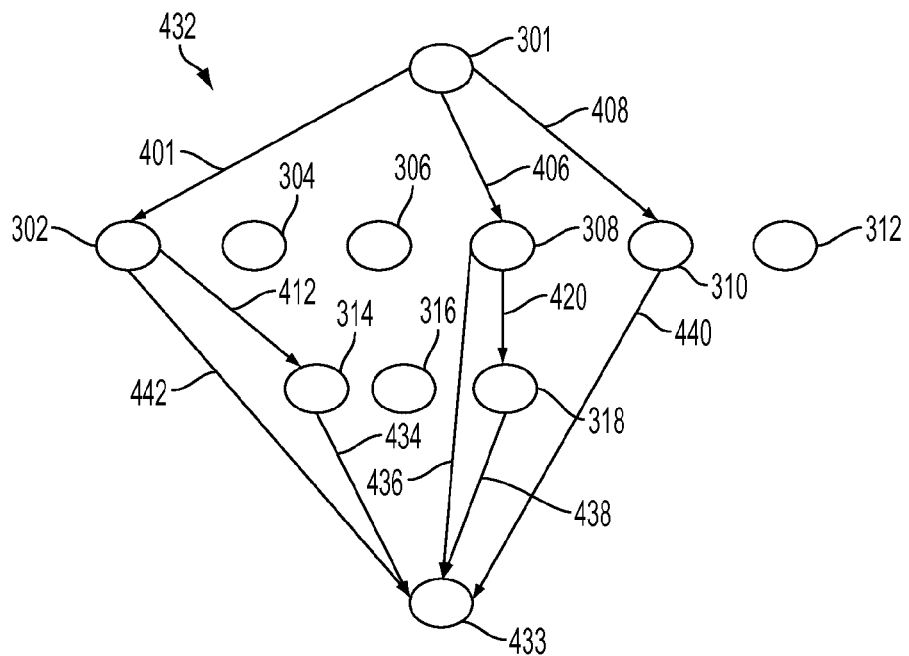
FIG. 4B illustrates a media adaptation graph for an example media renderer.

FIG. 4B illustrates an example media adaptation graph 432 distributing the content of media source 301 to a media renderer 433. Media adaptation graph 432 includes media source 301, media adapter 302, media adapter 304, media adapter 306, media adapter 308, media adapter 310, media adapter 312, media adapter 314, media adapter 316, media adapter 318 and media renderer 433.

For purposes of discussion, presume that media source 301 is operable to provide this media content in three different formats. Further, presume that media renderer 433 is operable to process the media content in five formats, which are all different from the three formats provided by media source 301.

Media source 301 outputs media content in the first format to media adapter 302 via data stream 401. Media source 301 outputs media content in the fourth format to media adapter 308 via data stream 406. Media source 301 outputs media content in the fifth format to media adapter 310 via data stream 408.

Media adapter 302 transcodes the media content from the first format to the seventh format, which is readable by media adapter 314, and then outputs the transcoded media content to media adapter 314 via data stream 412. Media adapter 308 transcodes the media content from the fourth format to an ninth format that is readable by media adapter 318 and then outputs the transcoded media content to media adapter 318 via data stream 420.

Media adapter 302 additionally transcodes the media content from the first format to a seventeenth format that is readable by media renderer 433 and then outputs the transcoded media content to media renderer 433 via a data stream 442. Media adapter 314 transcodes the media content from the seventh format to the tenth format, which is readable by media renderer 433, and then outputs the transcoded media content to media renderer 433 via a data stream 434. Media adapter 308 additionally transcodes the media content from the fourth format to a thirteenth format that is readable by media renderer 433 and then outputs the transcoded media content to media renderer 433 via a data stream 436. Media adapter 318 transcodes the media content from the ninth format to the fourteenth format, which is readable by media renderer 433, and then outputs the transcoded media content to media renderer 433 via a data stream 438. Media adapter 310 transcodes the media content from the fifth format to the fifteenth format, which is readable by media renderer 433, and then outputs the transcoded media content to media renderer 433 via a data stream 440.

Figure 4C:
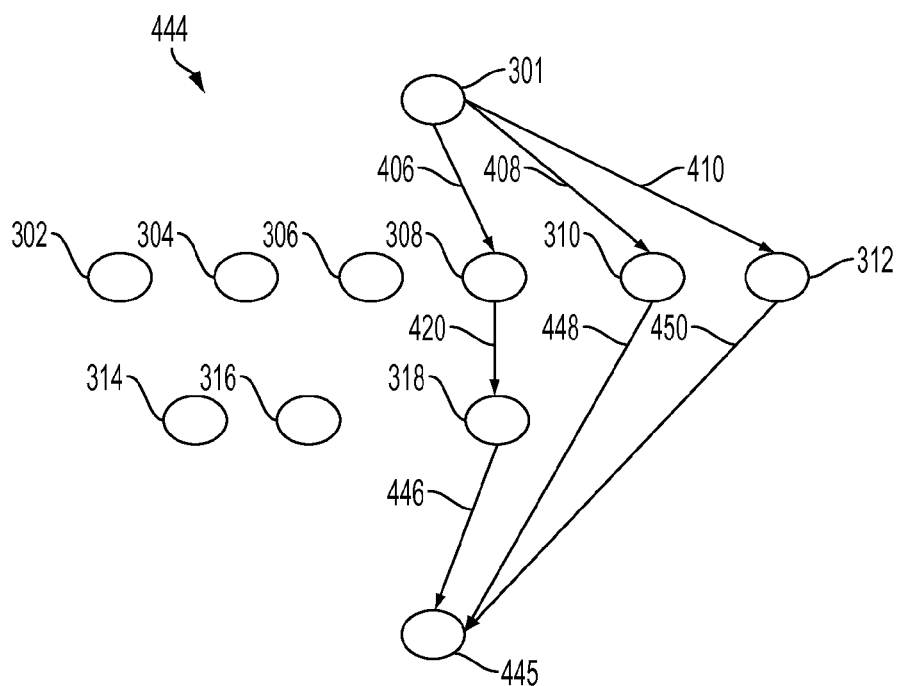
FIG. 4C illustrates a media adaptation graph for an example media renderer.

FIG. 4C illustrates an example media adaptation graph 444 distributing the content of media source 301 to a media renderer 445. Media adaptation graph 444 includes media source 301, media adapter 302, media adapter 304, media adapter 306, media adapter 308, media adapter 310, media adapter 312, media adapter 314, media adapter 316, media adapter 318 and media renderer 445.

For purposes of discussion, presume that media source 301 is operable to provide this media content in three different formats. Further, presume that media renderer 445 is operable to process the media content in three formats, which are all different from the three formats provided by media source 301.

Media source 301 outputs media content in the fourth format to media adapter 308 via data stream 406. Media source 301 outputs media content in the fifth format to media adapter 310 via data stream 408. Media source 301 outputs media content in the sixth format to media adapter 312 via data stream 410.

Media adapter 308 transcodes the media content from the fourth format to the ninth format, which is readable by media adapter 318, and then outputs the transcoded media content to media adapter 318 via data stream 420.

Media adapter 318 additionally transcodes the media content from the ninth format to the fourteenth format that is readable by media renderer 445 and then outputs the transcoded media content to media renderer 445 via a data stream 446. Media adapter 310 transcodes the media content from the fifth format to the fifteenth format, which is readable by media renderer 445, and then outputs the transcoded media content to media renderer 445 via a data stream 448. Media adapter 312 transcodes the media content from the sixth format to the sixteenth format, which is readable by media renderer 445, and then outputs the transcoded media content to media renderer 445 via a data stream 450.

Figure 4D:
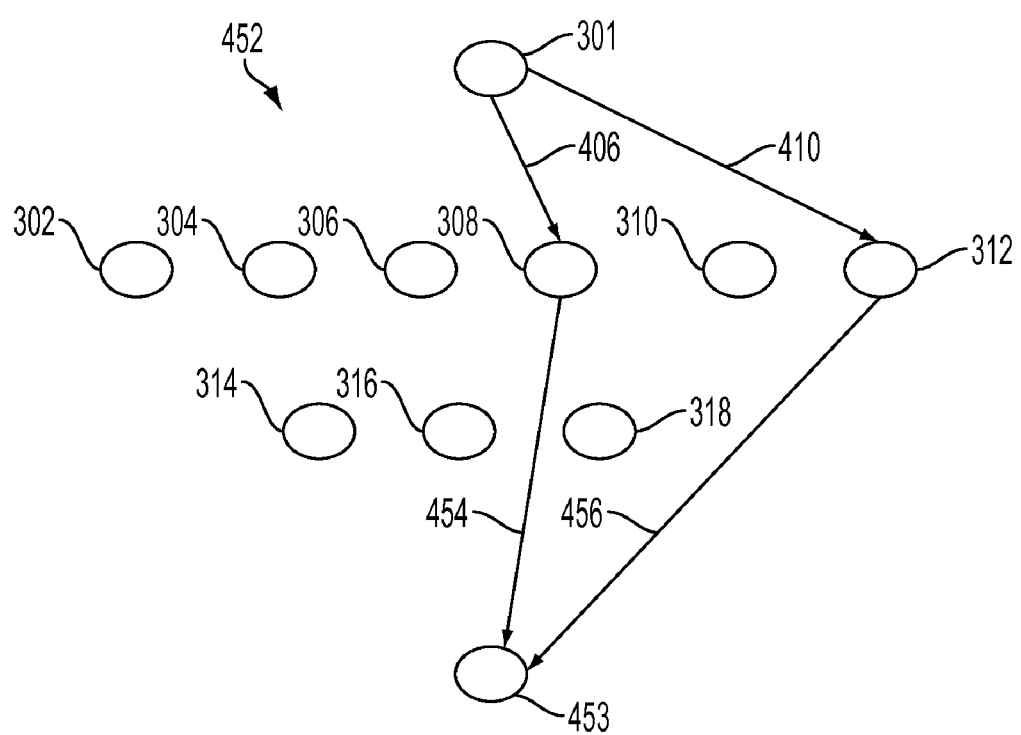
FIG. 4D illustrates a media adaptation graph for an example media renderer.

FIG. 4D illustrates an example media adaptation graph 452 distributing the content of media source 301 to a media renderer 453. Media adaptation graph 452 includes media source 301, media adapter 302, media adapter 304, media adapter 306, media adapter 308, media adapter 310, media adapter 312, media adapter 314, media adapter 316, media adapter 318 and media renderer 453.

For purposes of discussion, presume that media source 301 is operable to provide this media content in two different formats. Further, presume that media renderer 453 is operable to process the media content in two formats, which are both different from the two formats provided by media source 301.

Media source 301 outputs media content in the fourth format to media adapter 308 via data stream 406. Media source 301 outputs media content in the sixth format to media adapter 312 via data stream 410.

Media adapter 308 transcodes the media content from the fourth format to the thirteenth format, which is readable by media renderer 453, and then outputs the transcoded media content to media renderer 453 via a data stream 454. Media adapter 312 transcodes the media content from the sixth format to the sixteenth format, which is readable by media renderer 453, and then outputs the transcoded media content to media renderer 453 via a data stream 456.

FIG. 4A-4D illustrate media adaptation graphs connecting media source 301 to media renderer 431, media renderer 433, media renderer 445 and media renderer 453. A more complete media adaptation graph can be created by combining the media adaptation graphs illustrated in FIG. 4A-4D to the media adaptation graph depicted in FIG. 5.

Figure 5:
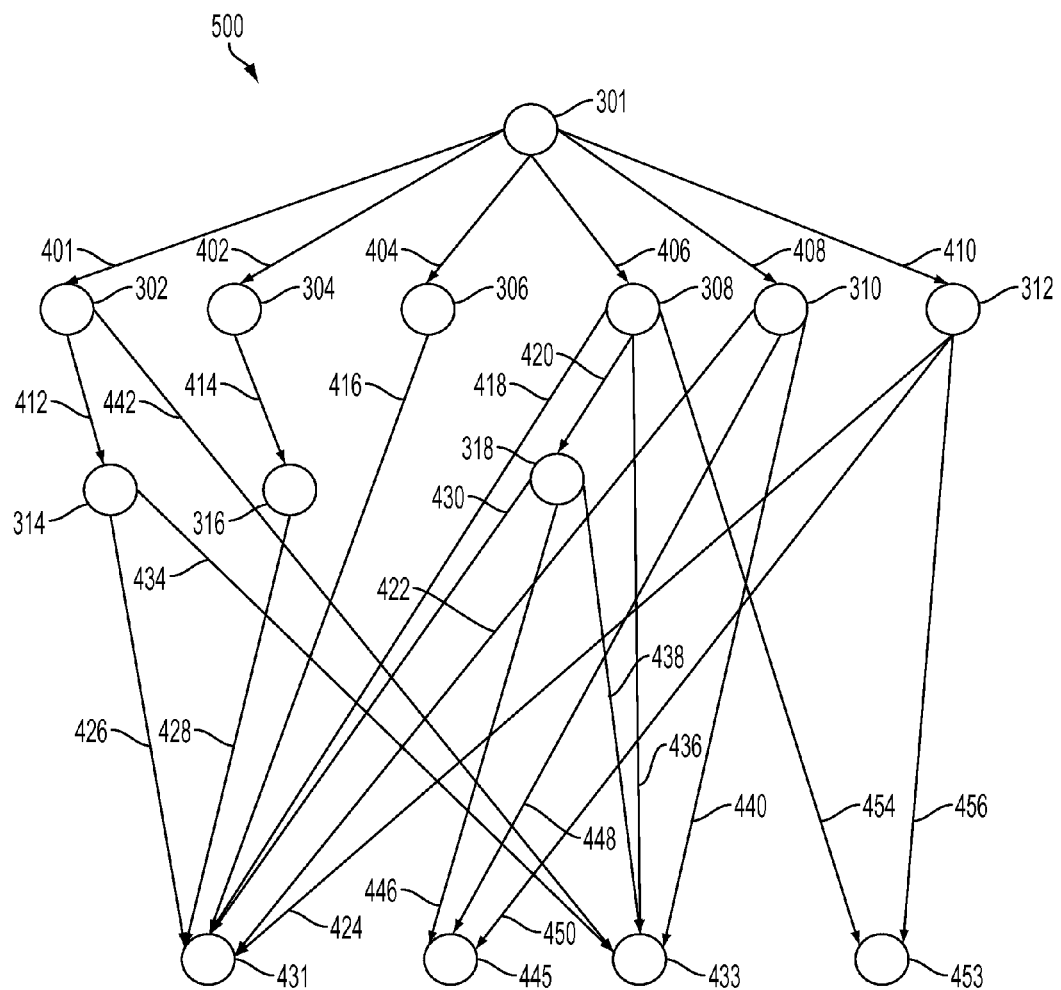
FIG. 5 illustrates a media adaptation graph including a plurality of media renderers.

FIG. 5 illustrates an example media adaptation graph 500 distributing the content of media source 301 to media renderer 431, media renderer 433, media renderer 445 and media renderer 453. Presume, to aid in the discussion that: media source 301 corresponds to media source 108 of media delivery network 100; media adapters 302, 304, 306, 308, 310, 312, 314, 316 and 318 correspond to media adapters 104 of media delivery network 100; and media renderers 431, 445, 433 and 453 correspond to media renderers 106 of media delivery network 100.

As illustrated in the figure: media adapter 302 is operable to transcode data from media source 301 received via data stream 401 and provide the transcoded data to media renderer 433 via data stream 442; media adapter 306 is operable to transcode data from media source 301 and provide the transcoded data to media renderer 431; media adapter 308 is operable to transcode data from media source 301 and provide the transcoded data to media renderer 431 and media renderer 453; media adapter 310 is operable to transcode data from media source 301 and provide the transcoded data to media renderer 431, media renderer 445 and media renderer 433; media adapter 312 is operable to transcode data from media source 301 and provide the transcoded data to media renderer 431, media renderer 445 and media renderer 453; media adapter 314 is operable to transcode data from media adapter 314 and provide the transcoded data to media renderer 431 and media renderer 433; media adapter 316 is operable to transcode data from media adapter 304 and provide the transcoded data to media renderer 431; and media adapter 318 is operable to transcode data from media adapter 308 and provide the transcoded data to media renderer 431, media renderer 445 and media renderer 433.

In operation, an example system represented by media adaptation graph 500 is intended to transmit media content associated with media source 301 to media renderer 431, media renderer 433, media renderer 445 and media renderer 453. To operate the system at high efficiency in accordance with an aspect of the invention, a utility function is maximized based on media adaptation graph 500 and constraints associated with the system. It should be noted that, for purposes of explanation, media adaptation graph 500 only includes media source 301, corresponding to media source 108 of media delivery network 100. A more complete media adaptation graph would include the additional media sources within media sources 102 of media delivery network, and their respective interconnection with media adapters 104 and media renderers 106.

An example system and method of maximizing a utility function of a media delivery network in accordance with an aspect of the present invention will now be described with additional reference to FIG. 6.

Figure 6:
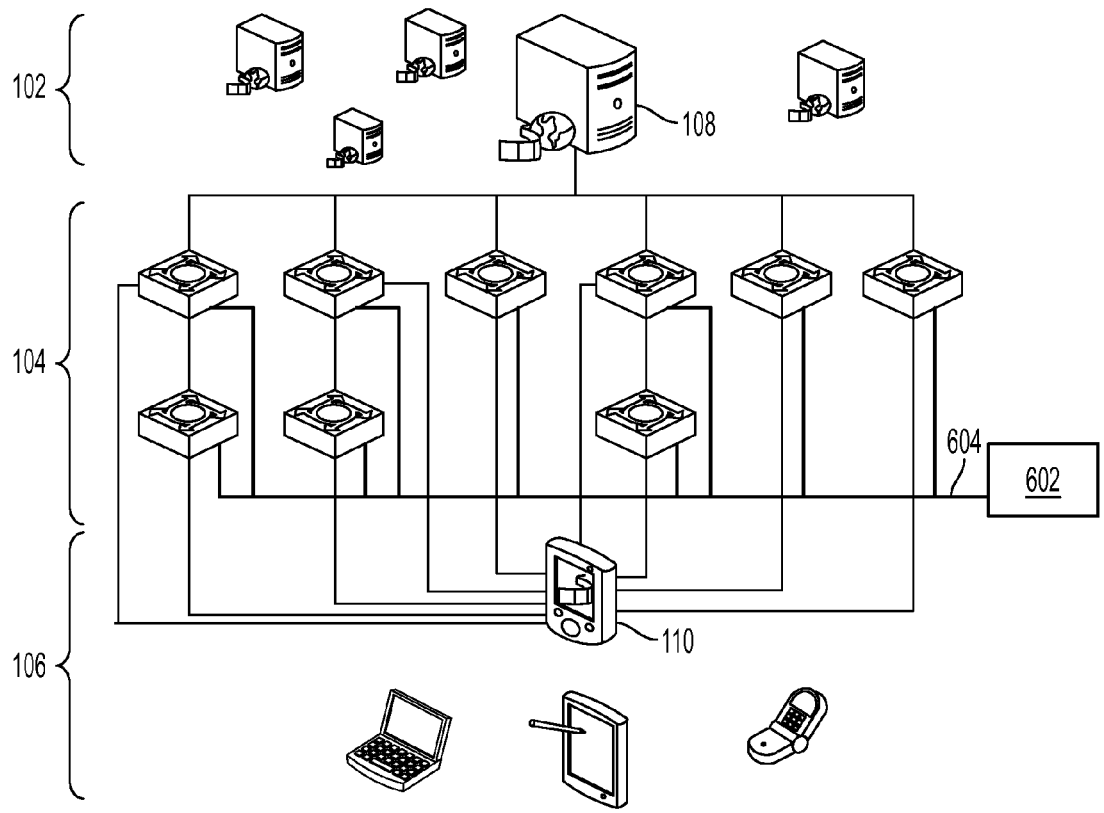
FIG. 6 illustrates an example network controlling device that may maximize utility of the media delivery network of FIG. 1 in accordance with an aspect of the present invention.

FIG. 6 illustrates an example network controlling device 602 that may maximize utility of media delivery network 100 in accordance with an aspect of the present invention.

Network controlling device 602 is arranged to control media adaptors 104 by way of control line 604. For ease of illustration, control line 604 is represented as a single control line. However, each of control media adaptors 104 may be individually controlled by a distinct control line from network controlling device 602. Control line 604 may be any known type of control line, non-limiting examples of which include a wireless data stream or a wired line.

It should be noted that network controlling device 602 is operable to control media adaptors 104 to provide media content from media source 108 to each of media renderers 106. However, to simplify the discussion, FIG. 6 illustrates media adaptors 104 providing media content to media renderer 110.

As will be described in more detail below, network controlling device 602 is operable to perform a plurality of functions in accordance with aspects of the present invention. Network controlling device 602 can store predetermined factors to measure a utility of media delivery network 100, and may define a utility function based on the predetermined factors. Further, network controlling device 602 may maximize the utility function in light of the defined constraints. Finally, network controlling device 602 may control media adaptors 104 such that media renderers 106 receive data based on the maximized utility function. Therefore, media provided by media sources 102 will be provided to media renderers in a manner that will maximize utility of media deliver network 100.

In other words, first media delivery network 100 is modeled by way of an adaptation graph, for example as illustrated in FIG. 5. Then predetermined factors, or constraints, are defined for the model of media delivery network 100, non-limiting examples of which include network flow balance, resource constraints, demand limitation and physical constraints. These predetermined factors are stored in network controlling device 602. At this point, network controlling device 602 maximizes a utility of media delivery network 100 in light of the defined constraints. This will be described in more detail below.

As mentioned above, one example constraint used in defining media delivery network 100 modeled by way of media adaptation graph 500 is network flow balance. For example, data streams 401, 402, 404, 406, 408, 410, 412, 414, 416, 418, 420, 422, 424, 426, 428, 430, 434, 436, 438, 440, 442, 446, 448, 450, 454 and 456 represent network flow between nodes of media adaptation graph 500. A physical constraint associated with the data streams may be that the information flow must be greater than or equal to zero, namely there cannot be negative information flow.

A specific example constraint used in defining media delivery network 100 modeled by way of media adaptation graph 500 may be information flow through a media adapter node. For example, a network flow balance constraint may be that the output of a media adapter node must equal the input for that media adapter node. For media adapter 302, the flow of data stream 401 must equal the sum of the flows of data stream 412 and data stream 442. For media adapter 304, the flow of data stream 402 must equal the flow of data stream 414. For media adapter 306, the flow of data stream 404 must equal the flow of data stream 416. For media adapter 308, the flow of data stream 406 must equal the sum of the flows of data stream 418, data stream 420, data stream 436 and data stream 454. For media adapter 310, the flow of data stream 408 must equal the sum of the flows of data stream 422, data stream 448 and data stream 440. For media adapter 312, the flow of data stream 410 must equal the sum of the flows of data stream 424, data stream 450 and data stream 456. For media adapter 314, the flow of data stream 412 must equal the sum of the flows of data stream 426 and data stream 434. For media adapter 316, the flow of data stream 414 must equal the flow of data stream 428. For media adapter 318, the flow of data stream 420 must equal the sum of the flows of data stream 430, data stream 446 and data stream 438.

As mentioned above, another example constraint used in defining media delivery network 100 modeled by way of media adaptation graph 500 may be a resource constraint. An example resource constraint may be a constraint on computing power of the nodes in the system. Every data stream by which a node is connected has an associated computation cost and the node can provide some maximum amount of computation. The sum of the computation costs for the data streams connected to a node cannot be more than the maximum computation capability.

For purposes of explanation of an example resource constraint, presume the following criteria are met. For media source 301, the sum of the computation costs associated with data stream 401, data stream 402, data stream 404, data stream 406, data stream 408 and data stream 410 cannot be greater than the maximum computation capability for media source 301. For media adapter 302, the sum of the computation costs associated with data stream 401, data stream 412 and data stream 442 cannot be greater than the maximum computation value for media adapter 302. For media adapter 304, the sum of the computation costs associated with data stream 402 and data stream 414 cannot be greater than the maximum computation value for media adapter 304. For media adapter 306, the sum of the computation costs associated with data stream 404 and data stream 416 cannot be greater than the maximum computation value for media adapter 306. For media adapter 308, the sum of the computation costs associated with data stream 406, data stream 418, data stream 420, data stream 436 and data stream 454 cannot be greater than the maximum computation value for media adapter 308. For media adapter 310, the sum of the computation costs associated with data stream 408, data stream 422, data stream 448 and data stream 440 cannot be greater than the maximum computation value for media adapter 310. For media adapter 312, the sum of the computation costs associated with data stream 410, data stream 424, data stream 450 and data stream 456 cannot be greater than the maximum computation value for media adapter 312. For media adapter 314, the sum of the computation costs associated with data stream 412, data stream 426 and data stream 434 cannot be greater than the maximum computation value for media adapter 314. For media adapter 316, the sum of the computation costs associated with data stream 414 and data stream 428 cannot be greater than the maximum computation value for media adapter 316. For media adapter 318, the sum of the computation costs associated with data stream 420, data stream 430, data stream 446 and data stream 438 cannot be greater than the maximum computation value for media adapter 318. For media renderer 431, the sum of the computation costs associated with data stream 426, data stream 428, data stream 416, data stream 418, data stream 430, data stream 422 and data stream 424 cannot be greater than the maximum computation value for media renderer 431. For media renderer 433, the sum of the computation costs associated with data stream 434, data stream 442, data stream 438, data stream 436 and data stream 440 cannot be greater than the maximum computation value for media renderer 433. For media renderer 445, the sum of the computation costs associated with data stream 446, data stream 448 and data stream 450 cannot be greater than the maximum computation value for media renderer 445. For media renderer 453, the sum of the computation costs associated with data stream 454 and data stream 456 cannot be greater than the maximum computation value for media renderer 453.

As mentioned above, another example constraint used in defining media delivery network 100 modeled by way of media adaptation graph 500 may deal with a quality of service. For example, an example system represented by media adaptation graph 500 may be capable of accommodating a maximum number of users associated with media renderer 431, media renderer 433, media renderer 445 and media renderer 453. Additionally, media renderer 431, media renderer 433, media renderer 445 and media renderer 453 may each require a minimum quantity of service from the example system. These constraints may include a demand limitation on an example system. Specifically, each data stream input to a media renderer is capable of satisfying some demand. Further, the sum of the supplied demand of all the data streams into a media renderer must be above a minimum and no greater than the requested demand.

For purposes of explanation of a quality of service constraint, presume the following criteria are met. For media renderer 431, the sum of the demand satisfied by data stream 426, data stream 428, data stream 416, data stream 418, data stream 430, data stream 422 and data stream 424 must be greater than or equal to the minimum demand of media renderer 431 and less than or equal to the current requested demand of media renderer 431. For media renderer 433, the sum of the demand satisfied by data stream 434, data stream 442, data stream 438, data stream 436 and data stream 440 must be greater than or equal to the minimum demand of media renderer 433 and less than or equal to the current requested demand of media renderer 433. For media renderer 445, the sum of the demand satisfied by data stream 446, data stream 448 and data stream 450 must be greater than or equal to the minimum demand of media renderer 445 and less than or equal to the current requested demand of media renderer 445. For media renderer 453, the sum of the demand satisfied by data stream 454 and data stream 456 must be greater than or equal to the minimum demand of media renderer 453 and less than or equal to the current requested demand of media renderer 453.

As discussed previously, after media delivery network 100 is modeled by way of an adaptation graph and after constraints are defined for the modeled media delivery network 100, network controlling device 602 may maximize a utility of media delivery network 100. However, before the utility is maximized, the utility must be defined. Network controlling device 602 may define an example utility function, in accordance with an aspect of the present invention, for the set of nodes and data streams in media adaptation graph 500, as will be described below.

A utility function, in accordance with an aspect of the present invention, may take into consideration several parameters to assess utility, non-limiting examples of which include media modality quality, resource usage ratio, device dependent satisfaction and network flow of an associated data stream. An example utility equation is as follows $$U = \sum_{j \in R} \sum_{i \in G} m_i s_{i,j} \eta_{i,j} x_{i,j}, \qquad (1)$$

where R represents the set of media renderer 431, media renderer 433, media renderer 445 and media renderer 453; G represents the set of all nodes of media adaptation graph 500; $m_i$ represents media modality quality of node i; $s_{i,j}$ represents the device dependent satisfaction of media renderer j of adapted media from node i; $\eta_{i,j}$ is the resource usage ratio for the data stream between node i and node j; and $x_{i,j}$ is the network flow of the data stream between node i and node j.

Media modality quality may be a measurement of the importance of certain types of adaptation in the network. For example, should the media content of media source 301 be a movie, the video quality may be more important than the audio quality and the media modality quality is a mathematical constant that relates the importance of each media adapter in an example system of media adaptation graph 500 with respect to the content of media source 301 and the type of adaptation of the specified media adapter. Device dependant satisfaction may be a subjective quantity to assess the satisfaction of an end user accessing the content of media source 301 at a media renderer using one of the data streams of media adaptation it is capable of receiving.

Resource usage ratio may be a measurement of the quality of a media stream along a data stream in media adaptation graph 500 in comparison to its usage of system resources. Typically, a high resource usage ratio yields better media quality and a lower resource usage ratio allows for greater user demand of content.

Resource usage ratio and network flow along data streams of media delivery network 100 as represented in media adaptation graph 500 may be controlled to maximize the utility of the system. By maximizing the utility given the constraints, the system may operate efficiently. Specifically, the system may be able to provide high quality media content to a plurality of users at minimal system resource usage rates.

Transmission of data through media delivery network 100 as represented in media adaptation graph 500 may adapt by any known adaptation system, i.e., when the environment (mainly resource constraint) changes, the resources may be allocated to ensure optimal solution for the new situation. A typical example of an environment changing is a changing number of users subscribing/unsubscribing to the media service. In order to achieve a new optimal solution, it is possible that the decision for existent users might need to be modified. Nevertheless, changing adaptation decision on the fly has a potential risk of degraded subjective satisfaction (e.g., switching between different media modalities may be annoying for users). Therefore, additional constraints are necessary to achieve balanced tradeoff.

The following describes a simulation experiment to validate an intelligent adaptation of media delivery network 100 as represented in media adaptation graph 500 in accordance with an aspect of the present invention. The values of $m_i$, i.e., the media modality of the node, are listed for media adapters 302, 304, 306, 308, 310, 312, 314, 316 and 318 are listed in Table 1. The values of $s_{i,j}$ of media renderers 431, 445, 433 and 453 are listed in Table 2. As mentioned above, a value $s_{i,j}$ represents the device dependent satisfaction of media renderer j of adapted media from node i. For example, in Table 2, the value of $s_{431,308}$ represents the device dependent satisfaction of a media renderer 431 of adapted media from media adapter 308. Note in Table 2, the renderer nodes with less capabilities are assigned bigger values. This reflects the relative satisfaction of the renderer nodes.

TABLE 1

$w_i$ used in the simulation

| | 302 | 304 | 306 | 308 | 310 | 312 | 314 | 316 | 318 |
|---|---|---|---|---|---|---|---|---|---|
| $m_i$ | 0.8 | 0.9 | 1.0 | 0.3 | 0.2 | 0.1 | 0.6 | 0.675 | 0.15 |

TABLE 2

$s_{i,j}$ used in the simulation

| $s_{i,j}$ | 302 | 304 | 306 | 308 | 310 | 314 | 316 | 318 | 320 |
|---|---|---|---|---|---|---|---|---|---|
| 431 | — | — | 1.0 | 1.0 | 1.0 | 1.0 | 1.0 | 1.0 | 1.0 |
| 445 | — | — | — | — | 2.0 | 1.5 | — | — | 2.0 |
| 433 | 1.25 | — | — | 1.25 | 1.25 | — | 1.25 | — | 1.25 |
| 453 | — | — | — | 3.0 | — | 3.0 | — | — | — |

In this example simulation, the bandwidth constraint for each adaptation node is set at 100 Mbps. However, it should be noted that some media adapters share the same resource constraint, such as media adapter 306, media adapter 308 and media adapter 310. For simplification, in the example simulation, only the resource usage ratio for video streams are considered and set to [0.5, 1]. Also for adaptive purposes, resource usage ratio for video streams can be modified within the allowed range.

The performance of the adaptation method in accordance with the present invention is evaluated in light of network bandwidth and computing capability, which are the most frequently considered resources. The results for bandwidth will now be described with reference to FIGS. 7A-7B.

Response of an example embodiment of the present invention will now be described with reference to FIGS. 7A-7B.

Figure 7A:
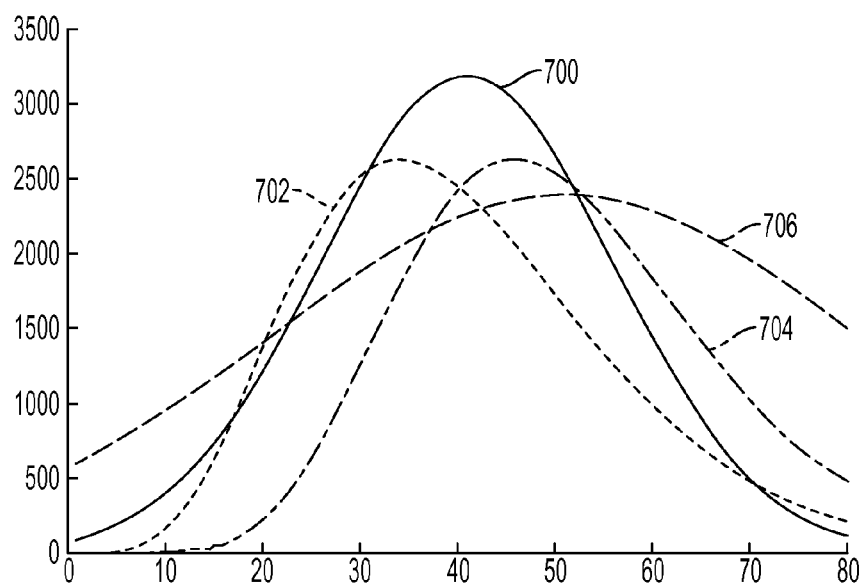
FIG. 7A illustrates example demand curves for a plurality of media renderers.

FIG. 7A is a graph of demand curves for media renderer 431, media renderer 433, media renderer 445 and media renderer 453. The x-axis represents time and the y-axis represents user demand. A curve 700 is the demand associated with media renderer 431. A curve 702 is the demand associated with media renderer 433. A curve 704 is the demand associated with media renderer 445. A curve 706 is the demand associated with media renderer 453. In general, in this example, each curve indicates that user demand for each media renderer starts out low and increases to a maximum amount. Then, in this example, the user demand for each media renderer decreases. These curves are merely examples used for purposes of explanation. Of course many different curves having many different properties will reflect actual demand of actual renderers.

The demand of media content for each type of renderer nodes follows the simulated network traffic illustrated in FIG. 7A. An adaptive system in accordance with an aspect of the present system is compared with a benchmark system called "Best Efforts", which always chooses the best adaptation decision (in terms of the utility) for the incoming renderer based on current bandwidth constraint. This comparison is illustrated in FIG. 7B.

Figure 7B:
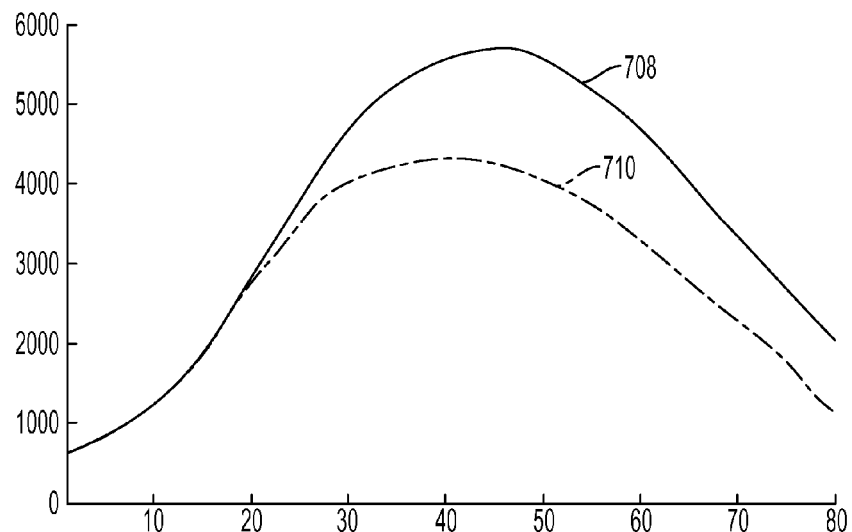
FIG. 7B illustrates example utility curves.

FIG. 7B illustrates utility curves for media adaptation graph 500. The x-axis represents time and the y-axis represents utility. A curve 708 shows the utility of media adaptation graph 500 according to demand curves shown in FIG. 7A using equation (1) to optimize utility. A curve 710 shows the utility of media adaptation graph 500 according to demand curves shown in FIG. 7A using a conventional method, namely optimized based on individual media renderers of media adaptation graph 500 and using equation (1) to show actual system utility.

Several facts may be observed from FIG. 7B. First, when the traffic is light (time index from 0~20), the example adaptive system in accordance with an aspect of the present system is identical to the benchmark system. This is understandable because there are more than sufficient resources so that the maximum capability constraints are not realized. Second, when the traffic is heavier (time index until 50), it is obvious that the example adaptive system in accordance with an aspect of the present system outperforms the benchmark system (up to 33% improvement). This is because the example adaptive system in accordance with an aspect of the present system is targeted at achieving a global optimal Solution of utility instead of maximizing individual benefit. Lastly, when the traffic drops (time index after 50), the example adaptive system in accordance with an aspect of the present system still provides better solutions than the benchmark method. This reflects the advantage of the adaptation: the example adaptive system in accordance with an aspect of the present system continues optimizing the adaptation decision and the system performance is well maintained. The "Best Efforts" method, on the contrary, simply drops the unsubscribed users and the spare resource will not be used efficiently.

The utility of an example system optimizing its parameters by way of equation (1) has utility as good as or better than the utility of conventional methods.

In the example embodiment discussed above with reference to FIG. 6, network controlling device 602 controls media adaptors such that media provided by media source 108 is provided to media renderers 106 in a manner to maximize utility of media delivery network 100. However, in another example embodiment, network controlling device 602 controls media adaptors such that media provided by any of media sources 102 is provided to media renderers 106 in a manner to maximize utility of media delivery network 100. This will be described below with further reference to FIG. 8.

Figure 8:
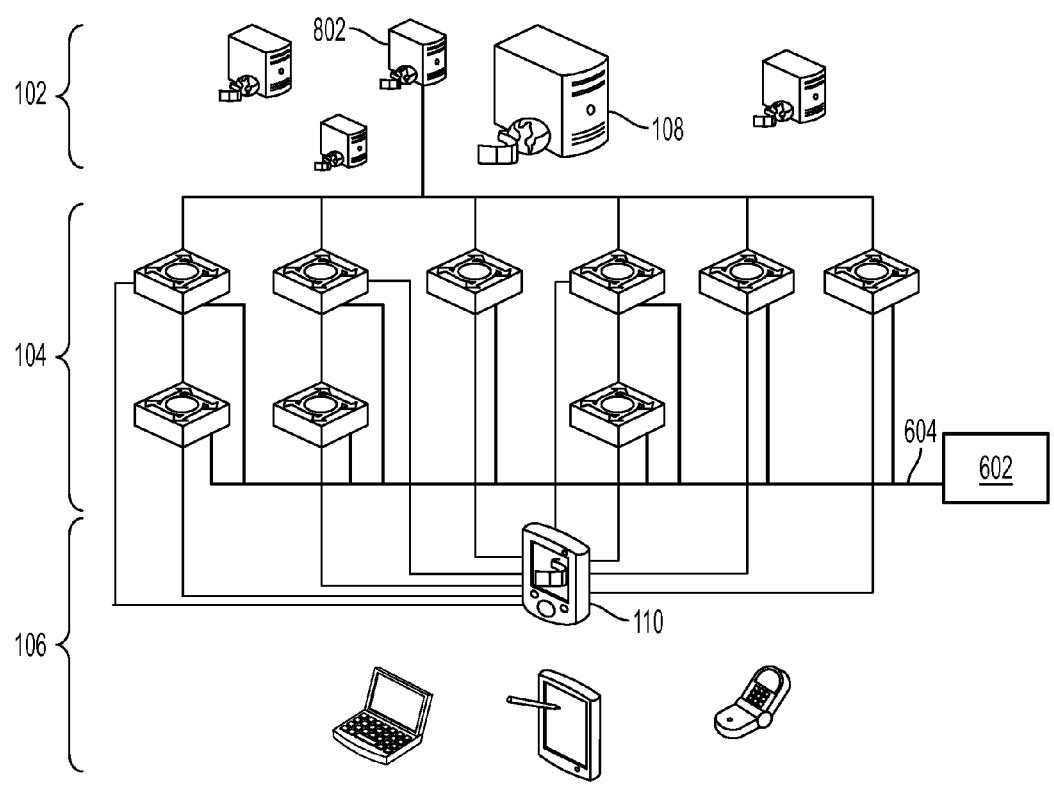
FIG. 8 illustrates another example embodiment, wherein a network controlling device maximizes utility of the media delivery network of FIG. 1 in accordance with an aspect of the present invention.

FIG. 8 illustrates another example embodiment, wherein network controlling device 602 maximizes utility of media delivery network 100 in accordance with an aspect of the present invention.

As mentioned above, network controlling device 602 is arranged to control media adaptors 104 by way of control line 604. In the example embodiment illustrated in FIG. 8, media adaptors 104 are arranged to receive media content from media source 802 and to provide media content to media renderer 110.

It should be noted that network controlling device 602 is operable to control media adaptors 104 to provide media content to each of media renderers 106. However, to simplify the discussion, FIG. 8 illustrates media adaptors 104 providing media content to media renderer 110.

Similar to the example embodiment discussed above with reference to FIG. 6, in the example embodiment illustrated in FIG. 8, network controlling device 602 may store predetermined factors to measure a utility of media delivery network 100 wherein media source 802 is providing the media content. Network controlling device may additionally define a utility function based on the predetermined factors. Further, network controlling device 602 may maximize the utility function in light of the defined constraints. Finally, network controlling device 602 may control media adaptors 104 such that media renderers 106 receive data based on the maximized utility function. Therefore, media provided by media sources 102 will be provided to media renderers in a manner that will maximize utility of media deliver network 100.

In the example embodiments discussed above with reference to FIGS. 6 and 8, network controlling device 602 is operable to control media adaptors 104 to provide media content from one of media sources 102 to each of media renderers 106. In other words, example embodiments discussed above with reference to FIGS. 6 and 8, network controlling device 602 is operable to control media adaptors 104 to adapt the input media content to the output media content by transcoding. However, network controlling device 602 is additionally operable to control media adaptors 104 to adapt the input media content to the output media content by stream switching. In other words, network controlling device 602 is additionally operable to control media adaptors 104 to provide media content from more than one of media sources 102 to media renderers 106. This will be described in more detail below with reference to FIG. 9.

Figure 9:
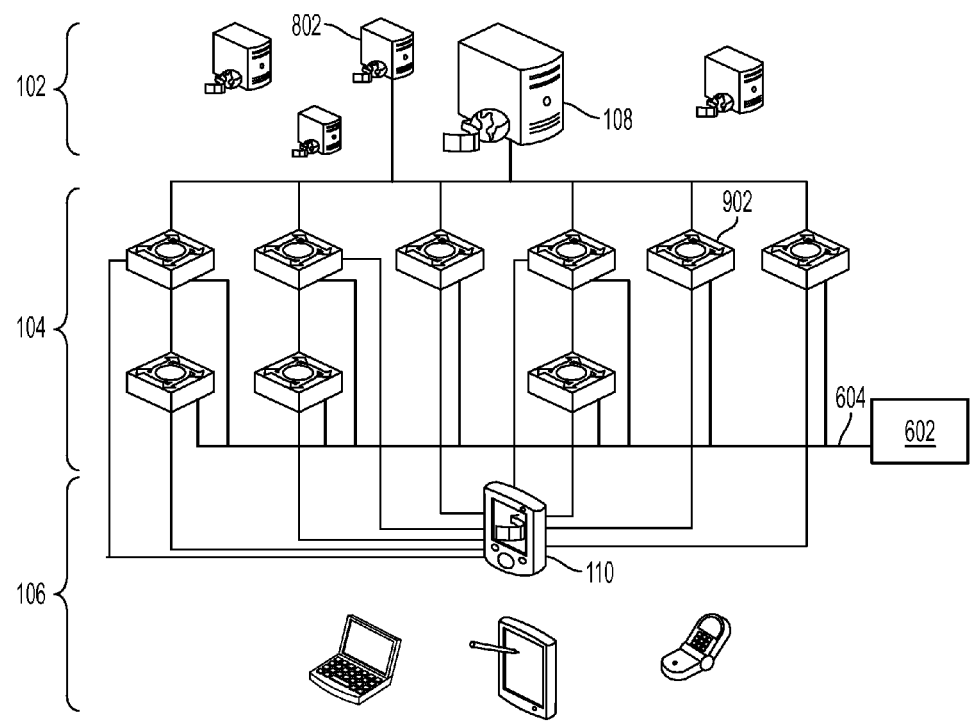
FIG. 9 illustrates another example embodiment, wherein a network controlling device maximizes utility of the media delivery network of FIG. 1 in accordance with another aspect of the present invention.

FIG. 9 illustrates another example embodiment, wherein network controlling device 602 maximizes utility of media delivery network 100 in accordance with another aspect of the present invention.

As mentioned above, network controlling device 602 is arranged to control media adaptors 104 by way of control line 604. In the example embodiment illustrated in FIG. 9, media adaptors 104 are arranged to receive media content from media source 802 and to receive media content from media source 108. In this example, media adaptors 104 are arranged to provide media content to media renderer 110.

It should be noted that any or all of media sources 102 may provide media content to any or all of media adaptors 104. However, to simplify the discussion, FIG. 9 illustrates media source 802 and media source 108 providing media content to media adapters 104.

It should additionally be noted that network controlling device 602 is operable to control media adaptors 104 to provide media content to each of media renderers 106. However, to simplify the discussion, FIG. 9 illustrates media adaptors 104 providing media content to media renderer 110. To still further simplify the discussion, FIG. 9 illustrates media adaptor 902 providing media content to media renderer 110.

In the example illustrated in FIG. 9, network controlling device 602 controls media adapter 902 to either output content corresponding to either the media content provided by media source 802 or the media content provided by media source 108. Further, network controlling device 602 may control media adapter 902 to switch its output, or switch the data streams, from the media content provided by one media source to the media content provided by the other media source.

Similar to the example embodiment discussed above with reference to FIGS. 6 and 8, in the example embodiment illustrated in FIG. 9, network controlling device 602 may store predetermined factors to measure a utility of media delivery network 100 wherein media source 802 and media source 108 are providing the media content. Network controlling device may additionally define a utility function based on the predetermined factors. Further, network controlling device 602 may maximize the utility function in light of the defined constraints. Finally, network controlling device 602 may control media adaptors 104 such that media renderers 106 receive data based on the maximized utility function. Therefore, media provided by media sources 102 will be provided to media renderers in a manner that will maximize utility of media deliver network 100.

Figure 10:
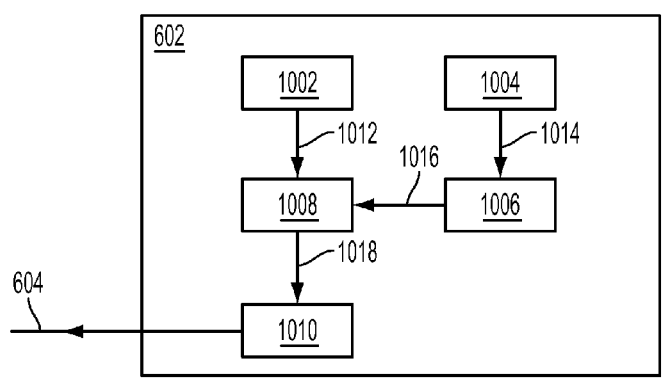
FIG. 10 illustrates an example network controlling device in accordance with an aspect of the present invention.

FIG. 10 illustrates an example network controlling device 602 in accordance with an aspect of the present invention.

As illustrated in FIG. 10, network controlling device 602 includes a constraint defining portion 1002, a factor portion 1004, a utility portion 1006, a processing portion 1008 and a controlling portion 1010. Constraint defining portion 1002 is operable to output a constraint signal 1012. Factor portion 1004 is operable to output a factor signal 1014. Utility portion 1006 is operable to output a utility signal 1016 based on the factor signal 1014. Processing portion 1008 is operable to output a processed signal 1018 based on the constraint signal 1012 and the utility signal 1016. Controlling portion 1010 is operable to output a control signal to control line 604 based on processed signal 1018.

Constraint defining portion 1002 is able to store defined constraints of media delivery network 100. As discussed above, once a model (such as discussed with reference to FIG. 5) is created for media delivery network 100, constraints are defined. Non-limiting examples of constraints include network flow balance, resource constraints, demand limitation and physical constraints. These parameters may be input into constraint defining portion 1002 by any known manner. Constraint defining portion 1002 then outputs information related to these constraints as constraint signal 1012.

Factor portion 1004 is able to store predetermined factors to measure a utility of media delivery network 100. Non-limiting examples of these predetermined factors include media modality quality, resource usage ratio, device dependent satisfaction and network flow of an associated data stream. These predetermined factors may be input into factor portion 1004 by any known manner.

Utility portion 1006 is able to define a utility function based on the predetermined factors. In an example embodiment, utility portion 1006 receives information related to the factors stored in factor portion 1004 by way of factor signal 1014. Utility portion 1006 then defines a utility function based on the signal 1014 in accordance with equation (1) discussed above. The result of the utility function is then output as utility signal 1016.

Processing portion 1008 is able to maximize the utility function in light of the defined constraints. In particular, processing portion 1008 maximizes the utility function as provided in utility signal 1016 in light of the information related to the constraints as provided by constraint signal 1012. Processing portion 1008 then outputs processed signal 1018 based on the maximization.

Controlling portion 1010 is able to control any or all of media adaptors 104 thereby arranging media renderers 106 to receive media content based on the maximized utility function. In particular, controlling portion 1010 controls media adaptors 104 based on processed signal 1018.

In example device 602 illustrated in FIG. 10, constraint defining portion 1002, factor portion 1004, utility portion 1006, processing portion 1008 and controlling portion 1010 are distinct elements. In other embodiments at least two of constraint defining portion 1002, factor portion 1004, utility portion 1006, processing portion 1008 and controlling portion 1010 may be a unitary element. In still other embodiments, any or all of the functions of constraint defining portion 1002, factor portion 1004, utility portion 1006, processing portion 1008 and controlling portion 1010 may be performed by a computer following computer instruction. In particular a computer may read a computer-readable medium that has computer-readable instructions stored thereon. These computer-readable instructions will instruct the computer to perform any or all of the functions of constraint defining portion 1002, factor portion 1004, utility portion 1006, processing portion 1008 and controlling portion 1010.

A media deliver networks may include a plurality of media sources, a plurality of media adaptors and a plurality of media renderers. The media sources may be able to provide different media content in different formats. The media renderers may be limited in the types of format for which they can render media content. The media adaptors adapt the content from the media sources so that the media renderers may render the media content.

In accordance with an aspect of the invention, a utility of a media delivery network may be maximized in light of predetermined constraints. In example embodiments, first the media delivery network is modeled by way of an adaptation graph and constraints are defined for the modeled media delivery network. Then a utility function media delivery network is maximized in light of the constraints. Then the media adaptors are controlled to provide media content to the media renderers based on the maximized utility function. In this manner, the utility of the media delivery network may constantly be at an optimum level.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method of maximizing utility of a media delivery network, said method comprising:
    defining constraints of the media delivery network, the media delivery network having a media source, a first media adaptor, a second media adaptor and a media renderer, the media source being operable to provide data in a first format and a second format, the first media adaptor being operable to receive the data in the first format from the media source, the second media adaptor being operable to receive the data in the second format from the media source, the first media adaptor being operable to provide data in a third format based on the received data in the first format, the second media adaptor being operable to provide data in a fourth format based on the received data in the second format, the media renderer being operable to render a first received data based on the data provided by the first media adaptor and to render a second received data based on the data provided by the second media adaptor;
    predetermining factors to measure a utility of the media delivery network, a factor comprising a media modality quality relating an importance of a media adapter to content of the media source and a type of adaptation of the media adaptor;
    defining a utility function based on the predetermined factors by defining a utility equation as $$U = \sum_{j \in R} \sum_{i \in G} m_i s_{i,j} \eta_{i,j} x_{i,j},$$

and
    wherein R represents the media renderer; G represents a set of nodes including the media source, the first media adapter and the second media adapter; $m_i$ represents media modality quality of node i; $s_{i,j}$ represents a device dependent satisfaction of the media renderer of adapted media from node i; $\eta_{i,j}$ is a resource usage ratio for a data stream between node i and node j; and $x_{i,j}$ is network flow of a data stream between node i and node j;
    maximizing the utility function in light of the defined constraints; and
    arranging the media renderer to receive one of the first received data and the second received data based on the maximized utility function.

2. The method of claim 1, wherein said defining constraints of the media delivery network comprises at least one of defining a flow balance of the media delivery network, defining a demand limitation and defining physical constraints of the first media adaptor.

3. The method of claim 1, wherein said predetermining factors to measure a utility of the media delivery network further comprises predetermining at least one of resource usage ratio, device dependent satisfaction and network flow of an associated data stream.

4. The method of claim 1, wherein said arranging the media renderer to receive one of the first received data and the second received data based on the maximized utility function comprises enabling one of the first media adaptor to provide data in the third format and the second media adaptor to provide data in the fourth format and preventing the other of the second media adaptor to provide data in the fourth format and the first media adaptor to provide data in the third format.

5. A method of maximizing utility of a media delivery network, said method comprising:
    defining constraints of the media delivery network, the media delivery network having a first media source, a second media source, a media adaptor and a media renderer, the first media source being operable to provide first data in a first format, the second media source being operable to provide second data in a second format, the media adaptor being operable to receive the first data in the first format from the first media source and to receive the second data in the second format from the second media source, the media adaptor being operable to provide data in a third format based on the received first data in the first format and to provide data in a fourth format based on the received second data in the second format, the media renderer being operable to render a first received data based on the data in the third format and to render a second received data based on the data in the fourth format;
    predetermining factors to measure a utility of the media delivery network, a factor comprising a media modality quality relating an importance of a media adapter to content of the media source and a type of adaptation of the media adaptor;
    defining a utility function based on the predetermined factors by defining a utility equation as $$U = \sum_{j \in R} \sum_{i \in G} m_i s_{i,j} \eta_{i,j} x_{i,j},$$

and wherein R represents the media renderer; G represents a set of nodes including the media source, the first media adapter and the second media adapter; $m_i$ represents media modality quality of node i; $s_{i,j}$ represents a device dependent satisfaction of the media renderer of adapted media from node i; $\eta_{i,j}$ is a resource usage ratio for a data stream between node i and node j; and $x_{i,j}$ is network flow of a data stream between node i and node j;

maximizing the utility function in light of the defined constraints; and arranging the media renderer to receive one of the first received data and the second received data based on the maximized utility function.

6. The method of claim 5, wherein said defining constraints of the media delivery network comprises at least one of defining a flow balance of the media delivery network, defining a demand limitation and defining physical constraints of the media adaptor.

7. The method of claim 5, wherein said predetermining factors to measure a utility of the media delivery network further comprises predetermining at least one of resource usage ratio, device dependent satisfaction and network flow of an associated data stream.

8. The method of claim 5, wherein said arranging the media renderer to receive one of the first received data and the second received data based on the maximized utility function comprises enabling one of the media adaptor to provide data in the third format and to provide data in the fourth format and preventing the other of the media adaptor to provide data in the fourth format and to provide data in the third format.

9. A device for maximizing utility of a media delivery network, said device comprising:

a computer including a non-transitory computer-readable medium having computer-readable instructions stored thereon, the computer-readable instructions, when executed by the computer, cause the computer to:

define constraints of the media delivery network, the media delivery network having a media source, a first media adaptor, a second media adaptor and a media renderer, the media source being operable to provide data in a first format and a second format, the first media adaptor being operable to receive the data in the first format from the media source, the second media adaptor being operable to receive the data in the second format from the media source, the first media adaptor being operable to provide data in a third format based on the received data in the first format, the second media adaptor being operable to provide data in a fourth format based on the received data in the second format, the media renderer being operable to render a first received data based on the data provided by the first media adaptor and to render a second received data based on the data provided by the second media adaptor;

store predetermined factors to measure a utility of the media delivery network, a factor comprising a media modality quality relating an importance of a media adapter to content of the media source and a type of adaptation of the media adaptor;

define a utility function based on the predetermined factors by defining a utility equation as $$U = \sum_{j \in R} \sum_{i \in G} m_i s_{i,j} \eta_{i,j} x_{i,j},$$

and wherein R represents the media renderer; G represents a set of nodes including the media source, the first media adapter and the second media adapter; $m_i$ represents media modality quality of node i; $s_{i,j}$ represents a device dependent satisfaction of the media renderer of adapted media from node i; $\eta_{i,j}$ is a resource usage ratio for a data stream between node i and node j; and $x_{i,j}$ network flow of a data stream between node i and node j;

maximize the utility function in light of the defined constraints; and control one of the first media adaptor and the second media adaptor thereby arranging the media renderer to receive one of the first received data and the second received data based on the maximized utility function.

10. The device of claim 9, wherein define constraints of the media delivery network comprises defining at least one of defining a flow balance of the media delivery network, defining a demand limitation and defining physical constraints of the first media adaptor.

11. The device of claim 9, wherein store predetermined factors to measure a utility of the media delivery network comprises storing at least one of resource usage ratio, device dependent satisfaction and network flow of an associated data stream.

12. The device of claim 9, wherein control one of the first media adaptor and the second media adaptor thereby arranging the media renderer to receive one of the first received data and the second received data based on the maximized utility function comprises enabling one of the first media adaptor to provide data in the third format and the second media adaptor to provide data in the fourth format and preventing the other of the second media adaptor to provide data in the fourth format and the first media adaptor to provide data in the third format.

13. A device for maximizing utility of a media delivery network, said device comprising:

a computer including a non-transitory computer-readable medium having computer-readable instructions stored thereon, the computer-readable instructions, when executed by the computer, cause the computer to:

define constraints of the media delivery network, the media delivery network having a media source, a first media adaptor, a second media adaptor and a media renderer, the media source being operable to provide data in a first format and a second format, the first media adaptor being operable to receive the data in the first format from the media source, the second media adaptor being operable to receive the data in the second format from the media source, the first media adaptor being operable to provide data in a third format based on the received data in the first format, the second media adaptor being operable to provide data in a fourth format based on the received data in the second format, the media renderer being operable to render a first received data based on the data provided by the first media adaptor and to render a second received data based on the data provided by the second media adaptor;

store predetermined factors to measure a utility of the media delivery network, a factor comprising a media modality quality relating an importance of a media adapter to content of the media source and a type of adaptation of the media adaptor;

define a utility function based on the predetermined factors by defining a utility equation as $$U = \sum_{j \in R} \sum_{i \in G} m_i s_{i,j} \eta_{i,j} x_{i,j},$$

and wherein R represents the media renderer; G represents a set of nodes including the media source, the first media adapter and the second media adapter; $m_i$ represents media modality quality of node i; $s_{i,j}$ represents a device dependent satisfaction of the media renderer of adapted media from node i; $\eta_{i,j}$ is a resource usage ratio for a data stream between node i and node j; and $x_{i,j}$ network flow of a data stream between node i and node j;

maximize the utility function in light of the defined constraints; and control one of the first media adaptor and the second media adaptor thereby arranging the media renderer to receive one of the first received data and the second received data based on the maximized utility function.

14. The device of claim 13, wherein define constraints of the media delivery network comprises defining at least one of defining a flow balance of the media delivery network, defining a demand limitation and defining physical constraints of the media adaptor.

15. The device of claim 13, wherein measure a utility of the media delivery network comprises storing at least one of media modality quality, resource usage ratio, device dependent satisfaction and network flow of an associated data stream.

16. The device of claim 13, wherein control one of the first media adaptor and the second media adaptor thereby arranging the media renderer to receive one of the first received data and the second received data based on the maximized utility function comprises enabling one of the media adaptor to provide data in the third format and to provide data in the fourth format and preventing the other of the media adaptor to provide data in the fourth format and to provide data in the third format.

* * * * *